US011535955B2

(12) United States Patent
Nasri et al.

(10) Patent No.: US 11,535,955 B2
(45) Date of Patent: Dec. 27, 2022

(54) DRAW DEVICE (71) Applicant: Truetzschler GmbH & Co. KG., Moenchengladbach (DE)

(72) Inventors: Lassad Nasri, Winterthur (CH); Jean Clarysse, Warth (CH)

(73) Assignee: TRÜTZSCHLER GROUP SE, Mönchengladbach (DE)

( * ) Notice: Subject to any disclaimer, the term of this patent is extended or adjusted under 35 U.S.C. 154(b) by 767 days.

(21) Appl. No.: 16/473,989

(22) PCT Filed: Jan. 11, 2018

(86) PCT No.: PCT/EP2018/050636
§ 371 (c)(1),
(2) Date: Jun. 26, 2019

(87) PCT Pub. No.: WO2018/130604
PCT Pub. Date: Jul. 19, 2018

(65) Prior Publication Data
US 2021/0130983 A1 May 6, 2021

(30) Foreign Application Priority Data

Jan. 12, 2017 (DE) .......................... 102017100488.2

(51) Int. Cl.
*B29C 35/16* (2006.01)
*D01D 5/16* (2006.01)
(Continued)

(52) U.S. Cl.
CPC ........... *D01D 13/02* (2013.01); *B29C 48/914* (2019.02); *D01D 5/22* (2013.01); *D02G 1/165* (2013.01);
(Continued)

(58) Field of Classification Search
CPC ........ B29C 35/16; B29C 48/914; D01D 5/16; D01D 5/22; D01D 13/00; D01D 13/02;
(Continued)

(56) References Cited

U.S. PATENT DOCUMENTS 3,671,623 A 6/1972 Fukushima et al.
4,035,879 A 7/1977 Schippers
(Continued)

FOREIGN PATENT DOCUMENTS

DE 10236359 A1 2/2004
EP 0784109 B1 9/2002
JP 2006-097177 A 4/2006

OTHER PUBLICATIONS

International Search Report for PCT/EP2018/050636 dated Feb. 23, 2018.
Written Opinion for PCT/EP2018/050636 dated Feb. 23, 2018.

*Primary Examiner* — Leo B Tentoni
(74) *Attorney, Agent, or Firm* — FisherBroyles, LLP; Robert Kinberg (57) ABSTRACT The present invention relates to a device and to a method for producing a texturized filament or yarn, wherein at least one filament is guided into a draw device, is guided there by a pair of intake rollers towards at least two pairs of drafting system rollers and drawn by the same, downstream of which is disposed a texturizing device with a cooling drum. Downstream the texturizing device with the cooling drum is disposed at least one cooled drafting system roller, by which the filament, respectively the yarn is cooled to a temperature of 0° C. to 50° C.

23 Claims, 3 Drawing Sheets

(51) Int. Cl.
- *D01D 13/00* (2006.01)
- *D02G 1/16* (2006.01)
- *D02J 1/20* (2006.01)
- *D01D 13/02* (2006.01)
- *D01D 5/22* (2006.01)
- *D02G 1/20* (2006.01)
- *D02J 1/08* (2006.01)
- *D02J 1/22* (2006.01)
- *D02J 13/00* (2006.01)
- *B29C 48/88* (2019.01)

(52) U.S. Cl.
CPC ............... *D02G 1/168* (2013.01); *D02G 1/20* (2013.01); *D02J 1/08* (2013.01); *D02J 1/22* (2013.01); *D02J 1/228* (2013.01); *D02J 13/005* (2013.01)

(58) Field of Classification Search
CPC .......... D02G 1/16; D02G 1/165; D02G 1/168; D02G 1/20; D02J 1/08; D02J 1/20; D02J 1/22; D02J 1/225; D02J 1/228; D02J 13/005
USPC ........ 264/28, 103, 168, 210.2, 210.3, 210.4, 264/210.7, 210.8, 211.14, 211.15, 237, 264/288.4, 289.3, 290.5, 290.7, 348; 425/66, 72.2, 324.1, 363; 28/104, 240, 28/271
See application file for complete search history.

(56) References Cited

U.S. PATENT DOCUMENTS

| | | | |
|---|---|---|---|
| 4,877,570 A * | 10/1989 | Nabulon | D02G 1/122 |
| | | | 264/168 |
| 5,558,825 A | 9/1996 | Ueda et al. | |
| 5,664,307 A | 9/1997 | Stitz et al. | |
| 5,698,146 A | 12/1997 | Schippers et al. | |
| 5,783,127 A | 7/1998 | Gross et al. | |
| 5,804,115 A | 9/1998 | Burton et al. | |
| 6,013,223 A | 1/2000 | Schwarz | |
| 6,055,712 A | 5/2000 | Thoma | |
| 6,105,224 A | 8/2000 | O'Mara, Jr. et al. | |
| 6,128,913 A * | 10/2000 | Dell'Acqua | D02J 13/005 |
| | | | 28/248 |
| 6,722,117 B2 | 4/2004 | Belcher, Jr. et al. | |
| 2001/0038159 A1 | 11/2001 | Maranca et al. | |
| 2002/0121011 A1* | 9/2002 | Rasnick, Jr. | D02G 1/20 |
| | | | 28/271 X |
| 2005/0022492 A1 | 2/2005 | Antouly | |
| 2005/0147784 A1 | 7/2005 | Chang et al. | |
| 2005/0278913 A1 | 12/2005 | Grassi | |
| 2007/0222104 A1 | 9/2007 | Sukuzi | |
| 2008/0041030 A1 | 2/2008 | Stundl | |
| 2008/0206381 A1* | 8/2008 | Price | D01D 5/22 |
| | | | 425/66 |
| 2009/0068463 A1* | 3/2009 | Mochizuki | D02G 1/16 |
| | | | 264/168 |
| 2012/0130024 A1 | 5/2012 | Sato et al. | |
| 2015/0218733 A1 | 8/2015 | Stundl et al. | |
| 2017/0037542 A1 | 2/2017 | Chen et al. | |

\* cited by examiner

DRAW DEVICE

CROSS-REFERENCE TO RELATED APPLICATIONS

This application is a U.S. National Stage Application of International Patent Application No. PCT/EP2018/050636, filed Jan. 11, 2018, which claims benefit of German Patent Application No. 10 2017 100 488.2, filed Jan. 12, 2017.

BACKGROUND OF THE INVENTION

The present invention relates to a device and to a method for producing a texturized filament or yarn, wherein at least one filament is guided into a draw device, is guided there by a pair of intake rollers to at least two pairs of drafting system rollers and is drawn by the same, downstream of which is disposed a texturizing device with a cooling drum.

For producing textile materials, in particular area rugs and upholstery, endless filaments are crimped in a texturizing nozzle such as to produce a crimped yarn. In this case, the endless filament, which was crimped in the texturizing nozzle, is deposited on the cooling drum almost without any tension, which non-positively retains the crimped endless filament by means of a vacuum applied inside the cooling drum. During the following removal of the endless filament from the cooling drum a very low thread tension is created, which is increased by following elements, such as a thread tensioner. However, said thread tensioners are disadvantageous in that the thereto linked friction, respectively heat neutralizes a part of the crimping, which is disadvantageous for the end product.

As said installations also produce coloured yarns by mixing several fibre bundles of different colours, the individual endless filaments need to be connected to each other so that a unique colour separation is recognizable, in order to produce a distinct colour effect in the end product. Usually, this is realized by tangling, in that the threads are interlaced with each other by means of lateral compressed air admission. Subsequently, crimping is realized in the stuffer box of a texturizing nozzle.

In order to prevent colour blending, namely to achieve a high colour distinction, it is the state-of-the-art to apply tangling after the spin-draw method and after texturizing, because the deformation of the complete strand is not at all desired, but the deformation of the individual filaments. In this case, it is assumed that tangling prior to drawing and texturizing will result in bonding or in considerable sticking of the filaments to each other, which necessarily results in blending or in indistinct separation of colours. Thereby, an installation for processing six or nine filaments becomes very expensive, because the texturizing nozzle likewise must comprise six or nine channels, and the cooling drum, the drafting system rollers and the deflections including bearings and temperature control need to be dimensioned correspondingly in order to guide the six, respectively nine filaments at a distance from each other.

The document EP 0 784 109 B1 describes a method for manufacturing a yarn having a plurality of differently coloured filament bundles. In this case, at least one filament bundle is treated individually upstream the connecting step and downstream all preceding drawing and texturizing procedures.

SUMMARY OF THE INVENTION

An object of the invention is the further development of a known device and a method with the outcome of improving the quality of a texturized endless filament. In this case, also the manufacturing of a texturized multi-coloured yarn is to be simplified in order to produce an end product with a distinct colour effect.

The above and other objects are achieved based on a device which in one embodiment includes a draw device into which at least one filament is guided for producing a texturized filament or yarn, comprising: a pair of intake rollers for receiving the at least one filament; two pairs of drafting system rollers following the pair of intake rollers to draw the at least one filament; a texturizing device with a cooling drum disposed downstream of the two pairs of drafting rollers to texturize the at least one filament; and at least one drafting system roller disposed downstream the texturizing device with the cooling drum by which the at least one texturized filament, respectively the yarn is cooled to a temperature of 0° C. to 50° C.

The invention includes the technical teaching that for producing a texturized filament or yarn at least one filament is guided into a draw device, is guided there by a pair of intake rollers towards at least two pairs of drafting system rollers and is drawn by the same, downstream of which is disposed a texturizing device with a cooling drum.

The invention is characterized in that at least one drafting system roller, by means of which the filament, respectively yarn is cooled to a temperature of 0° C. to 50° C., is disposed downstream the texturizing device with the cooling drum. The advantage of said installation is that after texturizing with the cooling drum the crimped filaments, respectively yarn pass over at least one further pair of drafting system rollers and there the crimp is further fixed at a temperature of 0° C. to 50° C., preferably at a temperature of 5° C. to 45° C., which is advantageous for the end product. The active cooling of the crimped filaments, respectively of the yarn, has a positive influence on the crystallinity as well as on the orientation of the molecules, whereby the crimped filaments become more elastic. The cooling may be realized in a passive way in that the filaments or the yarn release to an as massive a possible a drafting system roller. The cooling may as well be realized actively in that the drafting system rollers are cooled from the inside by means of circulating agents (air, water).

Preferably, the at least one drafting system roller is formed as a cooled mono-roller.

In a preferred embodiment, at least two cooled drafting system rollers are disposed downstream the cooling drum, whereby the detention time for cooling at high production speeds is extended.

Preferably, four drafting system rollers are disposed downstream the cooling drum, wherein the first and/or the fourth drafting system roller is formed as a cooled drafting system roller. Advantageously, thereby a drawing, respectively relaxing of the texturized filaments, respectively of the yarn may be achieved and fixed by the cooling prior and/or afterwards.

In particular at very high productions speeds, four cooled drafting system rollers downstream the cooling drum are able to reliably fix the texturized filaments, respectively the yarn and the crimping of the filaments may be durably kept.

According to a further exemplary embodiment, several filaments may be tangelaced to a yarn in the texturizing device. This is in particular advantageous with differently coloured filaments, because they will keep their colour distinction in the resulting yarn. For this purpose, upstream the texturizing device is disposed a nozzle for separately interlacing the individual filaments. Surprisingly, unlike the general opinion of the individuals skilled in the art, the short detention time in the nozzle has proven to allow for eliminating bonding and connecting of the filaments during the texturizing, a very high colour distinction is achievable.

In a further embodiment, the nozzle for interlacing the filaments is disposed downstream the two staged drawing and upstream the texturizing nozzle. In this case, the pair of drafting system rollers upstream the nozzle has the highest speed in the draw device, at which the filaments are conveyed. Thereby, a minimum detention time may be achieved in the nozzle, which prevents blending of the colours on account of potentially connecting the filaments to each other. In this case, the speed of the filaments on said drafting system rollers amounts to at least 1,700 m/min.

In order to obtain a uniform heating of the filaments, the drafting system rollers are formed as heated duo rollers.

With further advantage, the filaments, which consist of a plurality of endless filaments, prior to drawing, are respectively separately interlaced by means of a nozzle. Said interlacing may allow for further improving the following process of the second interlacing, because it stabilizes the texture of the individual filaments.

Basically, the nozzles for tanglelacing and interlacing may be operated at a pressure (overpressure) of 0.01 to 12 bar, wherein a gaseous medium, preferably air is laterally introduced into the nozzle and results in the tanglelacing, respectively the interlacing of the filaments. The best results with both nozzles have been observed, if the pressure amounts to between 0.01 to 6 bar. This achieved the highest colour distinction.

In the second embodiment, the nozzle for interlacing the filaments is disposed downstream the pair of intake rollers and upstream the drafting system rollers. According to the prevailing opinion, the colour distinction of the yarn would decrease with a subsequent drafting and texturizing, because the individual filaments bond to each other in the further process. Herein, a very short detention time of the filaments in the nozzle allowed for eliminating subsequent bonding and connecting of the filaments such as to likewise demonstrate the desired colour distinction.

The inventive method achieves the object in that at least one filament is guided into a draw device, is guided there by a pair of intake rollers to at least two pairs of drafting system rollers and is drawn by the same, is subsequently texturized, and cooled on a cooling drum.

The invention is characterized in that, downstream the cooling drum, the textured filament, respectively yarn is cooled by means of at least one drafting system roller to a temperature of 0° C. to 50° C. The cooling by means of the at least one drafting system roller may be realized actively or passively.

The advantage of said method is that after texturizing with the cooling drum the crimped filaments, respectively the yarn pass over at least one further pair of cooled drafting system rollers and the crimp is further fixed at a temperature of 0° C. to 50° C., preferably at a temperature of 5° C. to 45° C., which has an advantageous effect on the end product. The active cooling of the crimped filaments, respectively of the yarn, has a positive influence on the crystallinity as well as on the orientation of the molecules, whereby the crimped filaments become more elastic.

Preferably, the cooling of the at least one texturized filament, respectively yarn is realized on a mono-roller.

In a preferred embodiment, the cooling of the texturized filaments, respectively yarns is realized by at least two cooled drafting system rollers, which are disposed downstream the cooling drum, whereby the detention time for cooling at high production speeds is extended.

Preferably, four drafting system rollers are disposed downstream the cooling drum, wherein the first and/or the fourth drafting system roller is formed as a cooled drafting system roller. Advantageously, thereby a drawing, respectively relaxing of the texturized filaments, respectively of the yarn may be achieved and this may be fixed by the cooling prior and/or afterwards.

In particular at very high productions speeds, four cooled drafting system rollers downstream the cooling drum are able to reliably fix the texturized filaments, respectively the yarn and the crimping of the filaments may be durably kept.

According to a further exemplary embodiment, several filaments, in particular coloured filaments may be interlaced upstream the texturizing device. This is in particular advantageous with differently coloured filaments, because they will keep their colour distinction in the resulting yarn. The separate interlacing of the filaments is realized prior to texturizing, wherein based on the very short detention time of the filaments in the nozzle, surprisingly it has shown that bonding and connecting of the filaments during tanglelacing may be eliminated, so that a very high colour distinction is achievable.

In a further embodiment, the interlacing of the filaments is realized after the two-staged drawing and prior to texturizing.

With further advantage, the filaments, which consist of a plurality of endless filaments, are respectively separately interlaced by means of a nozzle prior to drafting. Said interlacing may allow for further improving the following process of tanglelacing, because it stabilizes the texture of the individual filaments.

Basically, the interlacing is realized at a pressure of 0.01 to 12 bar, wherein a gaseous medium, preferably air is laterally introduced into the nozzle and results in the tanglelacing, respectively the interlacing of the filaments. The best results are obtained, if the lateral pressure on the filaments amounts to between 0.01 to 6 bar. This achieved the highest colour distinction.

In a further embodiment, the interlacing of the filaments may be realized prior to drafting. According to the prevailing opinion, the colour distinction of the yarn would decrease with a subsequent drafting and texturizing, because the individual filaments bond to each other in the further process, which was not confirmed in experiments.

BRIEF DESCRIPTION OF THE DRAWINGS

Further measures enhancing the invention will be illustrated in more detail in the following in conjunction with the description of one preferred exemplary embodiment of the invention based on the Figures. It is shown in.

DETAILED DESCRIPTION OF THE INVENTION

Figure 1:
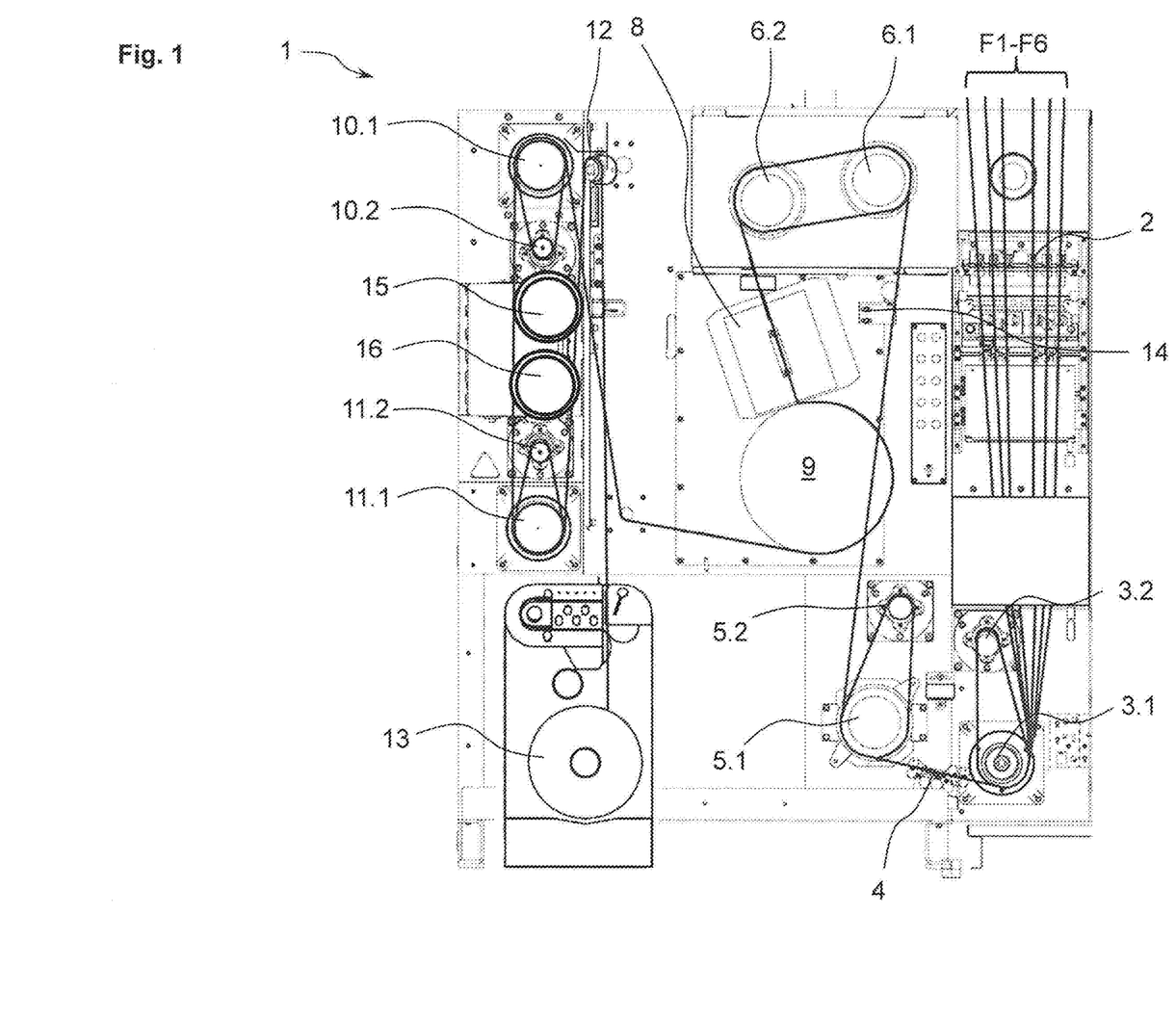
FIG. 1: a partial illustration of a first exemplary embodiment of a spin-draw installation.

FIG. 1 shows a section of a spin-draw installation according to a first exemplary embodiment, in which six filaments F1 to F6, for example made from polyamide 6 (PA6), enter the draw device 1 from non-illustrated spinning nozzles. Basically, said type of installation allows for processing of up to twelve filaments, wherein said exemplary embodiment describes the processing of six filaments. Each filament F1 to F6 consists of up to 1,000 endless filaments, which are combined to one filament F1 to F6 below the spinning head upstream of the draw device 1. The filaments F1 to F6 of polyamide 6 enter the draw device 1 at a speed of 925 m/min, and, in a preparation device 2, they are treated with oil or a sliding agent, and are rerouted to a first pair of drafting system rollers 5.1, 5.2 via a pair of intake rollers 3.1, 3.2. No or only little drawing at a factor of up to 1.05 is realized between the pair of intake rollers 3.1, 3.2 to the first pair of drafting system rollers 5.1, 5.2.

Optionally, a first nozzle 4, in which the six filaments F1 to F6 are laterally charged with a gaseous medium, preferably air, at a pressure of 0.01 to 12 bar, may be disposed between the pair of intake rollers 3.1, 3.2 and the pair of draw rollers 5.1, 5.2. The nozzle 4 includes a separate guide for each filament F1 to F6 so that the filaments F1 to F6 do not get in contact with each other. Up to 1,000 endless filaments are interlaced with each other within the guide of the nozzle 4 so that six separately interlaced filaments F1 to F6 exit the nozzle 4 and are guided onto the drafting system rollers 5.1, 5.2.

At the pair of drafting system rollers 5.1, 5.2, the filaments F1 to F6 are cooled to a temperature of 65° C. at a speed of 925 m/min Said pair of drafting system rollers 5.1, 5.2 is formed as a mono-roller, in which just the drafting system roller 5.1 is driven. The drafting system roller 5.2 is not driven, but rotates along due to the tension of the filaments F1 to F6. Also, the drafting system rollers 5.1, 5.2 may be configured as duo-rollers, in which both rollers are driven, and essentially have a same sized exterior diameter. This is advantageous in that the gradual heating of the filaments F1 to F6 may be realized more continuously over a longer period of time, which is advantageous for transforming the molecules. In this case, the surfaces of the pairs of drafting system rollers may be heated by means of a non-illustrated heating system, for example an electrical, vapour-based or liquid-based heating system, wherein in the following, it is assumed that during the at least double circulation around the pairs of draw rollers, the filaments F1 to F6 have also taken on the temperature of the pairs of draw rollers.

The filaments F1 to F6 are guided from the pair of draw rollers 5.1, 5.2 to the pair of draw rollers 6.1, 6.2, wherein previously they are kept at a distance from each other by means of a guide 14. The further drawing and heating on the pair of draw rollers 6.1, 6.2, which are configured as duo-rollers, is realized at a speed of 2,500 m/min and a heating to 170° C. The most important drawing in the draw device 1 is realized between the pair of draw rollers 5.1, 5.2 and the pair of draw rollers 6.1, 6.2, wherein the drawing may amount to between 2.4 to 3.1 depending on the material of the filaments F1 to F6.

In the following the filaments F1 to F6 enter a downstream disposed texturizing nozzle 8. Herein, the filaments F1 to F6 are crimped at a temperature of 180° C., and the texture thereof being frozen on the downstream cooling drum 9. The cooling drum 9 cools the crimped filaments F1 to F6 at a speed of 50 m/min. In this case, a vacuum of up to 50 mbar is generated on the cooling drum 9, which is generated by a blower or a fan and thereby keeps the crimped filaments on the surface by means of friction.

A following slight drawing is realized with the drafting system rollers 10.1, 10.2 and 11.1, 11.2, which may be actively cooled, wherein the drawing primarily serves for building up a tension onto the filaments. The speed of the filaments on the drafting system roller 10.1 may amount to 2,222 m/min. The drafting system roller 11.1 transports the filaments F1 to F6 at a speed of 2,257 m/min at a temperature of 0° C. to 50° C., preferably at a temperature of 5° C. to 45° C. Only a slight drawing at a factor of up to 1.05 occurs between the drafting system rollers 10.1, 10.2 and 11.1, 11.2. The cooling of the drafting system rollers is realized by a known fluid cooling, in which the heat from the yarn is removed by means of the coolant via a heat exchanger.

During a final deflection by the deflector 12 towards the lapper 13, the filaments are wound onto several coils at a speed of 2,201 m/min.

The advantage of said installation is that after texturizing with the cooling drum 9 the crimped filaments pass over at least one further pair of cooled drafting system rollers 10.1, 10.2 and there the crimp is further fixed at a temperature of 0° C. to 50° C., preferably at a temperature of 5° C. to 45° C., which has an advantageous effect on the end product. Preferably, the active cooling of the crimped filaments has a positive influence on the crystallinity as well as on the orientation of the molecules, whereby the crimped filaments become more elastic. Preferably, at least two pairs of cooled drafting system rollers 10.1, 10.2, 11.1, 11.2, on which the crimped filaments are further fixed at a temperature of 0° C. to 50° C., preferably at a temperature of 5° C. to 45° C., are disposed downstream the cooling drum 9.

Depending on the material of the filaments to be processed, up to four drafting system rollers 10, 11, 15, 16 may be disposed between the cooling drum 9 and the lapper 13. They may be embodied altogether as individual rollers, such as illustrated with the drafting system rollers 15 and 16, or as mono-rollers, as in the illustration of the drafting system rollers 10.1, 10.2, 11.1, 11.2 or else also embodied as duo-rollers. Depending on the installation configuration in terms of further drafting or relaxing the filaments, also different embodiments of drafting system rollers may be combined with each other. Also, in this embodiment, the crimped filaments are further fixed at a temperature of 0° C. to 50° C., preferably at a temperature of 5° C. to 45° C.

According to the exemplary embodiment of FIG. 1, downstream of the cooling drum the filaments F1 to F6 first run to the pair of drafting system rollers 10.1, 10.2, further on to the drafting system roller 15, then to the drafting system roller 16 and finally to the pair of drafting system rollers 11.1, 11.2, from which the filaments F1 to F6 are then guided to the lapper 13.

In this case, preferably the first pair of drafting system rollers 10.1, 10.2 is cooled in order to further fix the crimp downstream of the cooling drum 9. With the following further three drafting system rollers 15, 16, 11.1, 11.2, the crimped filaments may be further slightly drawn or also relaxed, whereby the lapper 13 reduces the tensile load on the filaments. Thereby, the crimped filaments become more elastic.

In a further alternative, the first and/or the last pair of the four drafting system rollers 10.1, 10.2, 11.1, 11.2 may be cooled. The first pair of drafting system rollers fixes the crimp one more time downstream the cooling drum 9. The two following drafting system rollers 15, 16 slightly draw the crimped filaments one more time with a drawing of 1.05 to 1.2, whereas the last pair of drafting system rollers 11.1, 11.2 fixes the crimped filaments one more time by means of active or passive cooling thereof. Carpet yarn having a very elastic puff is created.

The embodiment with four cooled drafting system rollers is advantageous in that in particular at very high production speeds, for example above 2,500 m/min, in the area of the drafting system rollers the molecules of the texturized filaments are very reliably fixed and the crimping of the filaments is durably maintained.

Figure 2:
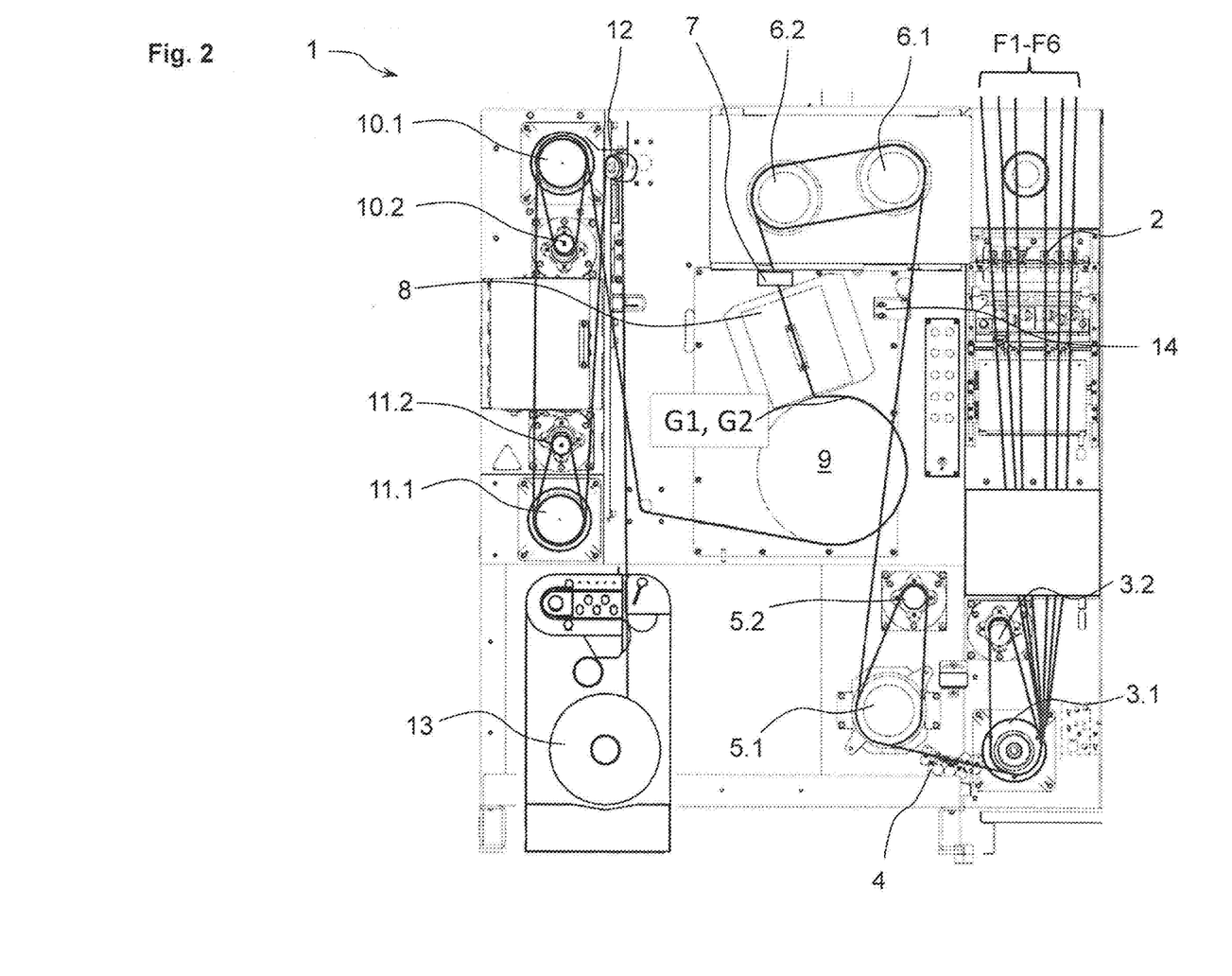
FIG. 2: a partial illustration of a second exemplary embodiment of a spin-draw installation.

FIG. 2 shows a section of a spin-draw installation according to a second exemplary embodiment, in which six differently coloured filaments F1 to F6, for example made from polyamide 6 (PA6), enter the draw device 1 from non-illustrated spinning nozzles. Basically, said type of installation allows for processing of up to twelve filaments, wherein said exemplary embodiment describes the processing of six filaments. The colouration of the filaments F1 to F6 is realized by different batches of plastic materials, which are separately extruded and respectively transformed into an endless filament by means of a spinning head. Each filament F1 to F6 consists of up to 1,000 endless filaments, which are combined to one filament F1 to F6 below the spinning head upstream the draw device 1. The filaments F1 to F6 of polyamide 6 enter the draw device 1 at a speed of 925 m/min, and, in a preparation device 2, they are treated with oil or a sliding agent, and are rerouted to a first pair of drafting system rollers 5.1, 5.2 via a pair of intake rollers 3.1, 3.2. No or only little drawing at a factor of up to 1.05 is realized between the pair of intake rollers 3.1, 3.2 and the first pair of drafting system rollers 5.1, 5.2.

Optionally, a first nozzle 4, in which the six filaments F1 to F6 are laterally charged with a gaseous medium, preferably air, at a pressure (overpressure) of 0.1 to 12 bar, may be disposed between the pair of intake rollers 3.1, 3.2 and the pair of draw rollers 5.1, 5.2. The nozzle 4 includes a separate guide for each filament F1 to F6 so that the filaments F1 to F6 do not get in contact with each other. Up to 1,000 endless filaments are interlaced with each other within the guide of the nozzle 4 so that six separately interlaced filaments F1 to F6 exit the nozzle 4 and are guided onto the pair of drafting system rollers 5.1, 5.2.

At the pair of drafting system rollers 5.1, 5.2, the filaments F1 to F6 are heated to a temperature of 65° C. at a speed of 925 m/min Said pair of drafting system rollers 5.1, 5.2 is formed as a mono-roller, in which just the drafting system roller 5.1 is driven. The drafting system roller 5.2 is not driven, but rotates along due to the tension of the filaments F1 to F6. Also, the drafting system rollers 5.1, 5.2 may be embodied as well as duo-rollers, in which both rollers are driven, and essentially have a same sized exterior diameter. This is advantageous in that the gradual heating of the filaments F1 to F6 may be realized more continuously over a longer period of time, which is advantageous for transforming the molecules. In this case, the surfaces of the pairs of drafting system rollers may be heated by means of a non-illustrated heating system, for example an electrical, vapour-based or liquid-based heating system, wherein in the following, it is assumed that during the at least double circulation around the pairs of draw rollers, the filaments F1 to F6 have also taken on the temperature of the pairs of draw rollers.

The filaments F1 to F6 are guided from the pair of draw rollers 5.1, 5.2 to the pair of draw rollers 6.1, 6.2, wherein previously they are kept at a distance from each other by means of a guide 14. The further drawing and heating on the pair of draw rollers 6.1, 6.2, which are configured as duo-rollers, is realized at a speed of 2,500 m/min and a heating to 170° C. The most important drawing in the draw device 1 is realized between the pair of draw rollers 5.1, 5.2 and the pair of draw rollers 6.1, 6.2, wherein depending on the material of the filaments F1 to F6 the drawing may amount to between 2.4 to 3.1.

The nozzle 7 likewise includes a separate guide for each filament F1 to F6 so that the filaments F1 to F6 do not get in contact with each other. The up to 1,000 endless filaments are interlaced with each other within the guide of the nozzle 7 so that six separately interlaced filaments F1 to F6 exit the nozzle 7 and enter the texturizing nozzle. Within the nozzle 7, the six filaments F1 to F6 are interlaced by means of a blown-in gaseous medium, preferably air, at a pressure of 0.01 to 12 bar. The formation of the yarns G1, G2 is realized in the texturizing nozzle 8, wherein altogether two crimped yarns G1, G2 are realized in the texturizing nozzle 8, which respectively consist of three filaments F1 to F3 and F4 to F6 having respectively one colour per filament. Thereby, each yarn G1, G2 may include three filaments having three different colours, which are clearly distinguished from each other. However, depending on the installation configuration, each yarn G1, G2 may consist of two or four filaments having a different colour.

The advantage of the invention in this embodiment consists in the fact that the yarn G1, G2 having the three filaments clearly indicates the colours of the filaments without any blending occurring. According to the state-of-the-art this would not be possible, because the individual filaments F1 to F3 and F4 to F6 would bond to each other, which would result in a non-distinct differentiation of the colours. In contrast to the state-of-the-art, surprisingly it has proven that with an extremely short detention time within the nozzle 7, the subsequent bonding of the filaments F1 to F3 and F4 to F6 may be prevented in the texturizing nozzle. As the speed of the filaments F1 to F6 in the entire draw device 1 is the highest at the drafting system rollers 6.1, 6.2, simultaneously, the detention time of the filaments F1 to F6 is shortest in the downstream disposed nozzle 7. At a speed of the filaments F1 to F6 around the drafting system rollers 6.1, 6.2 of 2,500 m/min for PA6, the detention time of the filaments F1 to F6 in the nozzle 7 amounts to just about 5 milliseconds.

With other plastic materials, the process parameters for the drafting system rollers may be for example the following:

| Parameter for | | Unit | PP | PA6 | PET | PA6-6 |
| --- | --- | --- | --- | --- | --- | --- |
| Intake rollers | Speed | m/min | 660 | 925 | 1,065 | 1,158 |
| 3.1, 3.2 | Temperature | ° C. | | | 110 | |
| Nozzle 4 | Pressure | bar | 0.1-12 | 0.1-12 | 0.1-12 | 0.1-12 |
| Drafting system | Speed | m/min | 670 | 925 | 1,110 | 1,208 |
| rollers 5.1, 5.2 | Temperature | ° C. | 80 | 65 | 135 | 80 |
| Drafting system | Speed | m/min | 2,030 | 2,500 | 3,200 | 2,960 |
| rollers 6.1, 6.2 | Temperature | ° C. | 130 | 170 | 165 | 200 |
| Nozzle 7 | Pressure | bar | 0.1-12 | 0.1-12 | 0.1-12 | 0.1-12 |
| Texturing | Pressure | bar | 7.0 | 7.9 | 7.0 | 7 |
| nozzle 8 | Temperature | ° C. | 160 | 180 | 180 | 240 |
| Cooling | Speed | m/min | 50 | 50 | 29 | 37 |

-continued

| Parameter for | Unit | PP | PA6 | PET | PA6-6 |
|---|---|---|---|---|---|
| drum 9 Cooling angle | ° | 160 | 165 | 170 | 170 |
| Drafting system Speed rollers 10.1, 10.2 Temperature | m/min ° C. | 1,660 0-50 | 2,222 0-50 | 2,785 0-50 | 2,710 0-50 |
| Drafting system Speed rollers 11.1, 11.2 Temperature | m/min ° C. | 1,710 0-50 | 2,257 0-50 | 2,810 0-50 | 2,772 0-50 |
| Lapper 13 Speed | m/min | 1,695 | 2,201 | 2,860 | 2,735 |

Advantageously, now just two yarns G1, G2 are texturized and further drawn, which makes the installation more compact and less expensive, than if six, respectively up to twelve filaments would be processed. The following drafting system rollers may be even embodied shorter, which simplifies the temperature control and the support.

After the nozzle 7, the filaments F1 to F6 enter the downstream disposed texturizing nozzle 8, in which they converge to the yarn G1 and G2, whereby the texturizing nozzle 8 just needs to be provided with two nozzle channels. Here, two crimped yarns G1, G2 are produced at a temperature of 180° C., the texture thereof being frozen on the downstream cooling drum 9. Now, downstream the nozzle 7, the filaments F1 to F6 are reheated in the texturizing nozzle 8, for PA6 from 170° C. to 180° C.

A subsequent slight drawing is realized with cold drafting system rollers 10.1, 10.2 and 11.1, 11.2, which may be actively or passively cooled. On the drafting system roller 10.1, the speed of the yarn amounts to 2,222 m/min. The drafting system roller 11.1 transports the yarn G1, G2 at a speed of 2,257 m/min at a temperature of 20° C. to 80° C., preferably at a temperature of 5° C. to 45° C. Only a slight drawing at a factor of up to 1.05 is realized between the drafting system rollers 10.1, 10.2 and 11.1, 11.2. The cooling of the drafting system rollers may be realized by a known fluid cooling, in which the heat from the yarn is removed by means of the coolant via a heat exchanger. Based on the short construction type of the drafting system rollers, the surface temperature may be very precisely adjusted. In this case, the installed power for cooling the drafting system rollers is considerably lower than in conventional cooling godets, which have to cool up to 12 filaments. Also herein, according to the exemplary embodiment of FIG. 1, the yarn may be cooled with up to four cooled drafting system rollers in different combinations.

During a final deflection by means of the deflector 12 towards the lapper 13 at a speed of 2,201 m/min the yarn G1, G2 is wound onto two coils.

The advantage of said installation is that after texturizing with the cooling drum 9 the crimped yarn passes over at least one further pair of cooled drafting system rollers 10.1, 10.2 and there the crimp is further fixed at a temperature of 0° C. to 50° C., preferably at a temperature of 5° C. to 45° C., which has an advantageous effect on the end product. The active cooling of the crimped yarn has a positive influence on the crystallinity as well as on the orientation of the molecules, whereby the crimped yarn becomes more elastic. Preferably, at least two pairs of cooled drafting system rollers 10.1, 10.2, 11.1, 11.2, on which the crimped yarn is further fixed at a temperature of 0° C. to 50° C., preferably at a temperature of 5° C. to 45° C., are disposed downstream the cooling drum 9.

The nozzle 4 may be optionally employed. The method for separately interlacing the filaments F1 to F6 in the nozzle 7 and combining them to yarns G1, G2 in the texturizing nozzle 8 may be also employed without the nozzle 4 and realizes good results. The utilization of the nozzle 4 for interlacing the individual filaments F1 to F6 is advantageous in that the texture of each individual filament F1 to F6 is more stable, which has a positive effect on the following interlacing in the nozzle 7. With the nozzle 4, which effects an interlacing of the up to 1,000 endless filaments of each filament F1 to F6, the colour separation becomes even clearer after interlacing in the nozzle 7.

Figure 3:
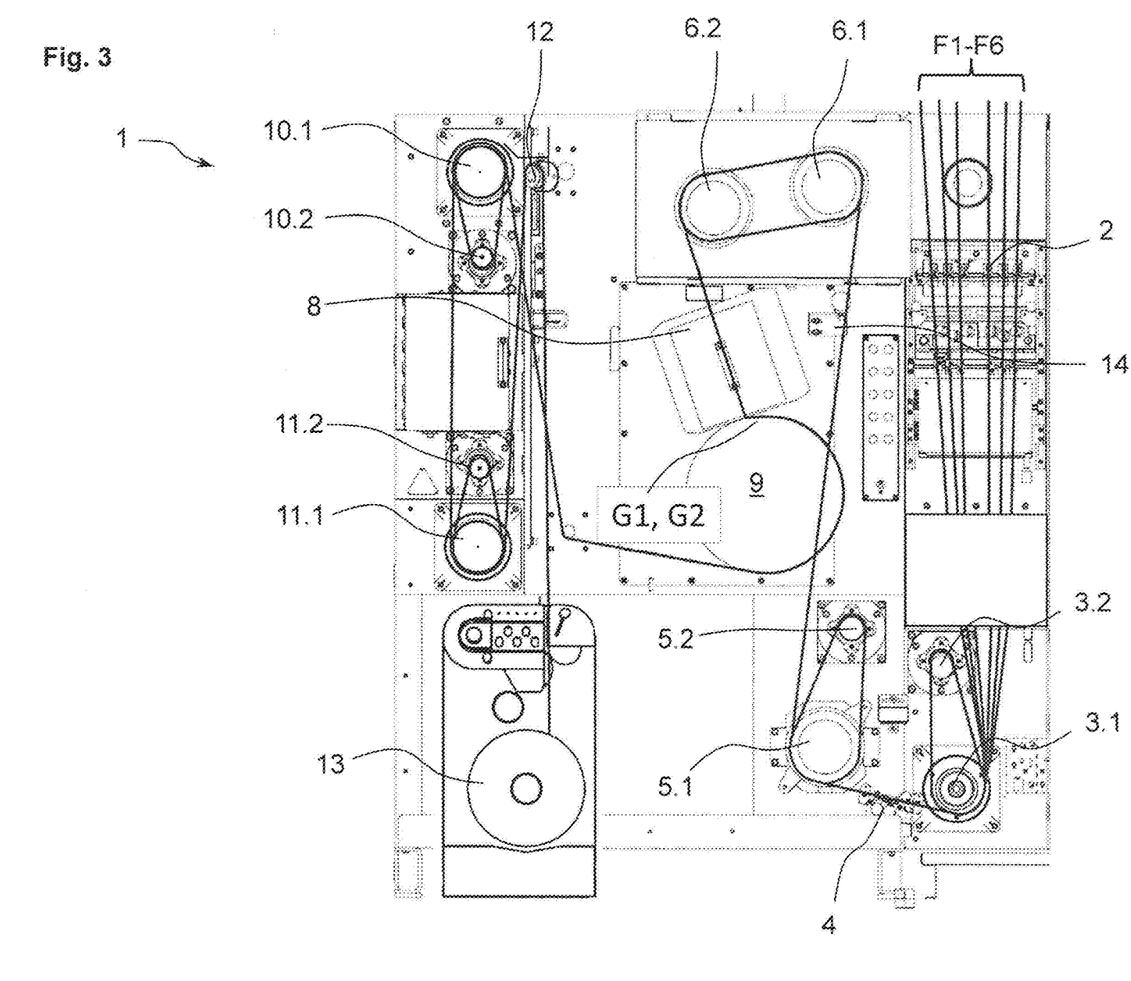
FIG. 3: a partial illustration of a third exemplary embodiment of a spin-draw installation.

In a third exemplary embodiment according to FIG. 3, for example the six filaments F1 to F6 are separately interlaced by utilizing the nozzle 4 between the pair of intake rollers 3.1, 3.2 and the drafting system rollers 5.1, 5.2. Based on the short detention time of the filaments F1 to F6 in the nozzle 4, a separate interlacing may be realized such that also in the following in the yarns G1, G2, which are produced from the six filaments F1 to F6 in the texturizing nozzle 8, a clear colour separation is achieved. The further processing of the filaments F1 to F6 is realized as according to the exemplary embodiment 1, however, without the nozzle 7. This configuration is advantageous in that the separately interlaced filaments F1 to F6 may be guided from the nozzle 4 on in an easier and more stable manner through the entire installation. Also according to this exemplary embodiment, due to a very short detention time of the filaments F1 to F6 in the nozzle 4, the colour separation may be maintained. In this case, the detention time of the plastic material of the filaments F1 to F6 in the nozzle 7 amounts to about 10 milliseconds.

Altogether up to twelve filaments (F1 to F12) of different colours having respectively up to 1,000 endless filaments may be processed in the installation, such as to be able to produce up to four yarns (G1 . . . G4), wherein each yarn may consist of two, three or four filaments of different colour.

Also in this exemplary embodiment, according to the exemplary embodiment of FIG. 1, the yarn may be cooled with up to four cooled drafting system rollers in different combinations.

Another advantage of the invention is that an existing installation with six, or up to twelve entering filaments just needs one texturizing nozzle 8 with two, respectively with up to four channels, such that in the following the drawing with the drafting system rollers 10.1, 10.2, 11.1, 11.2 may be built shorter. Thereby, a more efficient cooling of the drafting system rollers 10.1, 10.2, 15, 16, 11.1, 11.2 may be realized, whereby the installation becomes more energy-efficient. The shorter drafting system rollers 10.1, 10.2, 15, 16, 11.1, 11.2 allow for keeping the temperature level of each drafting system roller 10.1, 10.2, 15, 16, 11.1, 11.2 more precisely.

The indications in the exemplary embodiments refer to process parameters by way of example of polyamide 6. The invention may be employed with all types of polymers, such as for example PP, PET, PA6, PA6.6 or PBT.

The invention in the embodiment thereof is not limited to the above-indicated preferred exemplary embodiment.

Rather, a number of variants is conceivable, which utilize the illustrated solution, even though basically the embodiments may be different. All the features and/or advantages including constructional details or spatial arrangements resulting from the claims, the description or the drawings, may be essential to the invention individually or in the most various combinations.

The invention claimed is:

1. A draw device into which at least one filament is guided for producing a texturized filament or yarn, comprising:
   a pair of intake rollers for receiving the at least one filament;
   two pairs of drafting system rollers following the pair of intake rollers, to draw the at least one filament;
   a texturizing device with a cooling drum disposed downstream of the two pairs of drafting rollers to texturize the at least one filament; and
   at least one drafting system roller disposed downstream the texturizing device with the cooling drum by which the at least one texturized filament, respectively the yarn is actively cooled to a temperature of 0° C. to 50° C., the at least one drafting system roller being cooled from the inside by circulating media.

2. The device according to claim 1, wherein the at least one filament, respectively yarn is cooled to a temperature of 5° C. to 45° C.

3. The device according to claim 1, wherein the at least one drafting system roller comprises a mono-roller.

4. The device according to claim 1, wherein the at least one drafting system roller includes at least two cooled drafting system rollers disposed downstream the cooling drum.

5. The device according to claim 1, wherein the at least one drafting system roller includes four drafting system rollers disposed downstream the cooling drum, wherein the first and/or the fourth drafting system roller are/is formed as a cooled drafting system roller.

6. The device according to claim 1, wherein the at least one drafting system roller includes four cooled drafting system rollers disposed downstream the cooling drum.

7. The device according to claim 1, further including at least one nozzle disposed upstream the texturizing device in which each filament is separately interlaced, and wherein the texturizing device comprises a texturizing nozzle and at least one yarn is formed from the filaments in the texturizing nozzle.

8. The device according to claim 7, wherein the at least one nozzle is disposed downstream a second one of the two pairs of drafting system rollers and upstream the texturizing nozzle.

9. The device according to claim 7 wherein the at least one nozzle is disposed downstream the pair of intake rollers and upstream the two pairs of drafting system rollers.

10. The device according to claim 7, wherein a gaseous medium at a pressure of 0.01 to 12 bar is blown into the at least one nozzle.

11. The device according to claim 8, wherein the at least one filament is drawn on one of the pairs of drafting system rollers which is directly disposed upstream of the at least one nozzle, at a speed of at least 1,700 m/min.

12. The device according claim 1, wherein at least one of the two pairs of drafting system rollers is configured as a duo-roller.

13. A method for producing a texturized filament or yarn utilizing the draw device according to claim 1, comprising:
   guiding at least one filament into the draw device by the pair of intake rollers;
   drawing the at least one filament by the at least two pairs of drafting system rollers following the pair of intake rollers;
   subsequently texturizing the at least one filament in the texturizing device and cooling the at least one texturized filament on the cooling drum; and
   downstream of the cooling drum, actively cooling the texturized filament, respectively the yarn to a temperature of 0° C. to 50° C. by the at least one drafting system roller cooled from the inside by circulating media.

14. The method according to claim 13, wherein the at least one filament, respectively yarn is cooled to a temperature of 5° C. to 45° C.

15. The method according to claim 13, wherein the at least one drafting system roller comprises a cooled mono-roller.

16. The method according to claim 13, wherein the cooling of the at least one filament, respectively yarn is realized by at least two cooled drafting system rollers.

17. The method according to claim 13, wherein four drafting system rollers are disposed downstream of the cooling drum, and wherein the cooling of the at least one filament, respectively yarn is realized on the first and/or the fourth drafting system roller.

18. The method according to claim 13, wherein the cooling of the at least one filament, respectively yarn includes cooling on four cooled drafting system rollers.

19. The method according to claim 13, further comprising, prior to the texturizing, separately interlacing the respective filaments and forming at least one yarn from the individual filaments.

20. The method according to claim 19, further including realizing the interlacing of the filaments after a two-step drafting.

21. The method according to claim 19, including realizing the interlacing of the filaments prior to a drafting.

22. The method according to claim 19, wherein the interlacing of the filaments is realized by a gaseous medium at a pressure of 0.01 to 12 bar.

23. The method according to claim 13, including separately interlacing each filament in a nozzle, and upstream of the nozzle drawing on one of the pairs of drafting system rollers which is directly disposed upstream the nozzle, at a speed of at least 1,700 m/min.

* * * * *